United States Patent
Cole et al.

(10) Patent No.: US 10,650,227 B2
(45) Date of Patent: May 12, 2020

(54) FACE RECONSTRUCTION FROM A LEARNED EMBEDDING

(71) Applicant: Google LLC, Mountain View, CA (US)

(72) Inventors: Forrester H. Cole, Cambridge, MA (US); Dilip Krishnan, Arlington, MA (US); William T. Freeman, Acton, MA (US); David Benjamin Belanger, Cambridge, MA (US)

(73) Assignee: Google LLC, Mountain View, CA (US)

( * ) Notice: Subject to any disclaimer, the term of this patent is extended or adjusted under 35 U.S.C. 154(b) by 149 days.

(21) Appl. No.: 16/061,344

(22) PCT Filed: Sep. 27, 2017

(86) PCT No.: PCT/US2017/053681
§ 371 (c)(1),
(2) Date: Jun. 12, 2018

(87) PCT Pub. No.: WO2018/080702
PCT Pub. Date: May 3, 2018

(65) Prior Publication Data
US 2019/0095698 A1      Mar. 28, 2019

Related U.S. Application Data

(60) Provisional application No. 62/414,944, filed on Oct. 31, 2016.

(51) Int. Cl.
*G06K 9/00*         (2006.01)
*G06T 11/60*        (2006.01)
(Continued)

(52) U.S. Cl.
CPC ....... *G06K 9/00268* (2013.01); *G06K 9/6257* (2013.01); *G06N 20/00* (2019.01);
(Continued)

(58) Field of Classification Search
CPC .. G06K 9/00268; G06K 9/6257; G06T 11/60; G06T 17/00; G06T 15/02; G06T 2210/44; G06N 20/00
See application file for complete search history.

(56) References Cited

U.S. PATENT DOCUMENTS 7,848,548 B1 * 12/2010 Moon ................ G06K 9/00281
                                                382/100
8,824,808 B2 * 9/2014 Brandt ............... G06K 9/00248
                                                345/420
(Continued)

OTHER PUBLICATIONS

International Search Report and Written Opinion from PCT/US2017/053678, dated Dec. 6, 2017, 12 pages.
Blanz et al., "A Morphable Model for the Synthesis of 3D Faces", 26th Annual Conference on Computer Graphics and Interactive Techniques, Los Angeles, California, Aug. 8-13, 1999, pp. 187-194.
Cootes et al., "Active Appearance Models", 5th European Conference on Computer Vision, Freiburg, Germany, Jun. 2-6, 1998, 16 pages.
(Continued)

*Primary Examiner* — Ming Y Hon
(74) *Attorney, Agent, or Firm* — Dority & Manning, P.A.

(57) ABSTRACT

The present disclosure provides systems and methods that perform face reconstruction based on an image of a face. In particular, one example system of the present disclosure combines a machine-learned image recognition model with a face modeler that uses a morphable model of a human's facial appearance. The image recognition model can be a deep learning model that generates an embedding in response to receipt of an image (e.g., an uncontrolled image of a face). The example system can further include a small, lightweight, translation model structurally positioned between the image recognition model and the face modeler. The translation model can be a machine-learned model that is trained to receive the embedding generated by the image recognition model and, in response, output a plurality of facial modeling parameter values usable by the face modeler to generate a model of the face.

15 Claims, 9 Drawing Sheets

(51) Int. Cl.
G06T 15/02 (2011.01)
G06N 20/00 (2019.01)
G06K 9/62 (2006.01)
G06T 17/00 (2006.01)

(52) U.S. Cl.
CPC .............. *G06T 11/60* (2013.01); *G06T 15/02* (2013.01); *G06T 17/00* (2013.01); *G06T 2210/44* (2013.01)

(56) References Cited

U.S. PATENT DOCUMENTS

| | | | | |
|---|---|---|---|---|
| 10,474,883 | B2* | 11/2019 | Yu | G06K 9/00295 |
| 2008/0192991 | A1* | 8/2008 | Gremse | G06K 9/00288 |
| | | | | 382/118 |
| 2013/0169621 | A1* | 7/2013 | Mei | G06T 17/00 |
| | | | | 345/419 |
| 2015/0052084 | A1* | 2/2015 | Kolluru | G06F 16/90335 |
| | | | | 706/11 |
| 2018/0137678 | A1* | 5/2018 | Kaehler | G02B 27/017 |

OTHER PUBLICATIONS

GitHub, "Morphing Faces: Repository for the Morphing Faces Demo", https://vdumoulin.github.io/morphing_faces/, retrieved on Jun. 11, 2018, 6 pages.

Kulkarni et al., "Deep Convolutional Inverse Graphics Network", Advances in Neural Information Processing Systems, Mar. 11, 2015, 10 pages.

Liu et al., "Deep Learning Face Attributes in the Wild" International Conference on Computer Vision, Santiago, Chile, Dec. 11-18, 2015, pp. 3730-3738.

Richardson et al., "3D Face Reconstruction by Learning from Synthetic Data", Fourth International Conference on 3D Vision, Stanford, California, Oct. 25-28, 2016, pp. 460-469.

Zhmoginov et al., "Inverting Face Embeddings with Convolutional Neural Networks", arXiv:1606.04189v2, Jun. 7, 2016, 12 pages.

Zhong et al., "Leveraging Mid-Level Deep Representations for Predicting Face Attributes in the Wild", International Conference on Image Processing, Phoenix, Arizona, Sep. 25-28, 2016, pp. 3239-3243.

* cited by examiner even lighting, and/or other factors. For example, a photo-
FACE RECONSTRUCTION FROM A LEARNED EMBEDDING

FIELD

The present disclosure relates generally to face reconstruction and face image analysis. More particularly, the present disclosure relates to reconstruction of a face from an embedding obtained from a machine-learned facial recognition model.

BACKGROUND

In certain scenarios, knowledge of values for one or more facial attributes (e.g., face shape, eye color, hair length, etc.) of a face can be desirable. For example, an artistic rendering of a particular face can be generated using values for the one or more facial attributes for such face. In one light-hearted example, the artistic rendering can be personalized emojis that include a cartoon version of the face (e.g., along with a humorous phrase).

In certain existing products, to obtain an artistic rendering such as personalized emojis, users may be required to manually enter or select particular values for the one or more facial attributes. This process can be time-consuming and is prone to lower quality results since the user is tasked with manually choosing the correct values and/or selecting the correct values from a limited number of available options.

Thus, a technical problem exists which can be summarized as the inability to automatically generate accurate values for facial attributes based on an input image that depicts a face. In particular, one particularly challenging scenario is the automatically generation of values for such facial attributes when only an uncontrolled image of the face is available. In particular, an uncontrolled image can be an image that does not satisfy all of a number of desired factors. For example, uncontrolled images can be images in which the image and/or subject fails to exhibit neutral facial expression, front-facing pose (e.g., looking into the camera), even lighting, and/or other factors. For example, a photograph of a person looking away from the camera in poor lighting conditions may be an uncontrolled image. Thus, a technical problem exists which can be summarized as the inability to automatically generate accurate values for facial attributes based on an uncontrolled image of a face.

In addition, a number of techniques exist for computer-aided reconstruction of a human face. For example, certain existing computer-implemented facial modeling techniques can generate a textured three-dimensional model of a face from a photographic image of the face. A two-dimensional image of the face can be rendered based on the three-dimensional model.

However, many of such computer-aided reconstruction techniques require iterative optimization (e.g., iterative optimization of the generated model relative to the photographic image) or require a large training set of facial modeling parameters. Reconstruction techniques that rely on iterative optimization can be slow and computationally expensive. In addition, optimization can sometimes fail to converge or can produce extremely low quality results.

Thus, a technical problem exists which can be summarized as the undesirable reliance of facial reconstruction techniques on iterative optimization and/or use of an undesirably large training set of images and facial modeling parameters.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to obtain facial attribute data of a face. The method includes obtaining, by one or more computing devices, an image of a face. The method includes obtaining, by the one or more computing devices, an embedding supplied by a machine-learned image recognition model. The embedding is supplied by the machine-learned image recognition model in response to receipt of the image of the face by the image recognition model. The method includes inputting, by the one or more computing devices, the embedding into a machine-learned translation model. The method includes receiving, by the one or more computing devices, a plurality of facial modeling parameter values as an output of the translation model. The plurality of facial modeling parameter values is descriptive of a plurality of facial attributes of the face.

In some implementations, obtaining, by the one or more computing devices, the image of the face comprises obtaining, by the one or more computing devices, an uncontrolled image of the face. In some implementations, obtaining, by the one or more computing devices, the embedding comprises obtaining, by the one or more computing devices, the embedding supplied by the machine-learned image recognition model in response to receipt of the uncontrolled image of the face by the image recognition model.

In some implementations, the method further includes inputting, by the one or more computing devices, the plurality of facial modeling parameter values into a face modeler. In some implementations, the method further includes receiving, by the one or more computing devices, a model of the face as an output of the face modeler.

In some implementations, the method further includes generating, by the one or more computing devices, an artistic rendering of the face based as least in part on the model of the face.

In some implementations, generating, by the one or more computing devices, the artistic rendering of the face comprises inputting, by the one or more computing devices, the model into a face renderer. In some implementations, generating, by the one or more computing devices, the artistic rendering of the face comprises receiving, by the one or more computing devices, a controlled rendering of the face as an output of the face renderer.

In some implementations, the method further includes ascertaining, by the one or more computing devices, values for one or more of the plurality of facial attributes directly from the controlled rendering of the face.

In some implementations, obtaining, by the one or more computing devices, the embedding supplied by the machine-learned image recognition model comprises obtaining, by the one or more computing devices, the embedding supplied by the machine-learned image recognition model at a hidden layer of the machine-learned image recognition model.

In some implementations, obtaining, by the one or more computing devices, the embedding supplied by the machine-learned image recognition model comprises inputting, by the one or more computing devices, the image of the face into the machine-learned image recognition model. In some implementations, obtaining, by the one or more computing devices, the embedding supplied by the machine-learned image recognition model comprises receiving, by the one or more computing devices, the embedding from the machine-learned image recognition model.

In some implementations, the method further includes training, by the one or more computing devices, the translation model based on a set of training data that comprises a plurality of example embeddings respectively labeled with a plurality of example facial modeling parameter values.

In some implementations, the method further includes generating, by the one or more computing devices, the set of training data. In some implementations, generating the set of training data comprises generating, by the one or more computing devices, the plurality of example facial modeling parameter values, the plurality of example facial modeling parameter values different from each other. In some implementations, generating, by the one or more computing devices, the set of training data generating, by the one or more computing devices a plurality of face morphs respectively based at least in part on the plurality of example facial modeling parameter values. In some implementations, generating, by the one or more computing devices, the set of training data comprises generating, by the one or more computing devices, the plurality of face morphs into the machine-learned image recognition model to respectively obtain the plurality of example embeddings. In some implementations, generating, by the one or more computing devices, the set of training data comprises generating, by the one or more computing devices, the plurality of example embeddings respectively with the plurality of example facial modeling parameter values.

Another example aspect of the present disclosure is directed to a computing system configured to obtain facial attribute data from an image of a face. The computing system includes at least one processor. The computing system includes a machine-learned translation model that is operable to receive an embedding obtained from a machine-learned image recognition model and, in response to receipt of the embedding, output a plurality of facial modeling parameter values that are descriptive of a plurality of facial attributes of the face. The computing system includes at least one non-transitory computer-readable medium that stores instructions that, when executed by the at least one processor, cause the computing system to: obtain the embedding from the image recognition model, the embedding produced by the image recognition model in response to receipt of the image of the face by the image recognition model; input the embedding into the translation model; and receive the plurality of facial modeling parameter values as an output of the translation model.

In some implementations, the computing system comprises a face modeler that is operable to receive the plurality of facial modeling parameter values and, in response to receipt of the plurality of facial modeling parameter values, output a model of the face. Execution of the instructions further causes the computing system to input the plurality of facial modeling parameter values into the face modeler. Execution of the instructions further causes the computing system to receive the model of the face as an output of the face modeler.

In some implementations, execution of the instructions further causes the computing system to generate an artistic rendering of the face based at least in part on the model of the face.

In some implementations, the computing system comprises a face renderer that is operable to receive the plurality of facial modeling parameter values and, in response to receipt of the plurality of facial modeling parameter values, output a controlled rendering of the face. Execution of the instructions further causes the computing system to input the plurality of facial modeling parameter values into the face renderer. Execution of the instructions further causes the computing system to receive the controlled rendering of the face as an output of the face renderer.

In some implementations, execution of the instructions further causes the computing system to ascertain values for one or more of the plurality of facial attributes directly from the controlled rendering of the face. In some implementations, execution of the instructions further causes the computing system to generate an artistic rendering of the face based at least in part on the controlled rendering of the face.

In some implementations, the computing system comprises the machine-learned image recognition model. Execution of the instructions further causes the computing system to input the image of the face into the machine-learned image recognition model. Execution of the instructions further causes the computing system to obtain the embedding from a pooling layer of the machine-learned image recognition model.

In some implementations, the computing system translation model comprises a neural network.

Another example aspect of the present disclosure is directed to one or more non-transitory computer-readable media that collectively store a machine-learned face reconstruction model and instructions. The machine-learned face reconstruction model is operable to receive an embedding for a face and, in response to receipt of the embedding, output a reconstructed representation of the face. When executed by one or more computing devices, the instructions cause the one or more computing devices to: obtain an embedding from a machine-learned image recognition model, the embedding produced by the image recognition model in response to receipt of an image of the face by the image recognition model; input the embedding into the machine-learned face reconstruction model; and receive the reconstructed representation of the face as an output of the face reconstruction model.

In some implementations, the machine-learned face reconstruction model is structured as a machine-learned autoencoder that is operable to receive the embedding for the face and, in response to receipt of the embedding, output the reconstructed representation of the face.

In some implementations, the machine-learned autoencoder is structured as a machine learned variational autoencoder.

In some implementations, the machine-learned face reconstruction model is structured as a machine-learned translation model that is operable to receive the embedding and, in response to receipt of the embedding, output a plurality of facial modeling parameter values, the plurality of facial modeling parameter values descriptive of a plurality of facial attributes of the face. In some implementations, the machine-learned face reconstruction model is structured as a face renderer that is operable to receive the plurality of facial modeling parameter values from the machine-learned translation model and, in response to receipt of the plurality of facial modeling parameter values, output a controlled rendering of the face.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
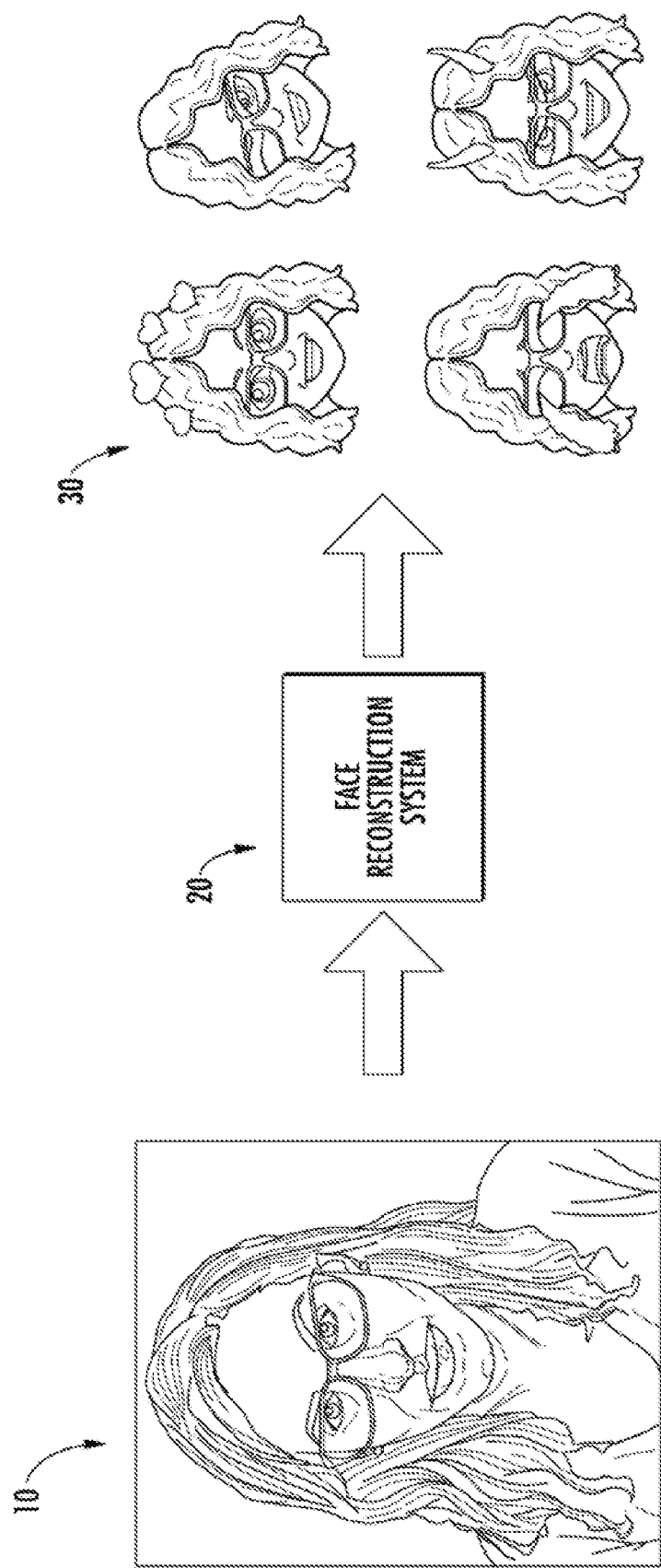
FIG. 1A depicts an example use of a face reconstruction system to generate an example artistic rendering from an example image according to example embodiments of the present disclosure.

Reference numerals that are repeated across plural figures are intended to identify the same features in various implementations.

DETAILED DESCRIPTION

Overview

Generally, the present disclosure is directed to systems and methods that perform face reconstruction based on an image of a face. The image of the face can be a controlled image or an uncontrolled image of the face. In particular, one example system of the present disclosure combines a machine-learned image recognition model with a face modeler that uses a morphable model of a human's facial appearance. The image recognition model can be a deep learning model that generates an embedding in response to receipt of an image (e.g., an uncontrolled image of a face). The example system can further include a small, lightweight, translation model structurally positioned between the image recognition model and the face modeler. The translation model can be a machine-learned model that is trained to receive the embedding generated by the image recognition model and, in response, output a plurality of facial modeling parameter values usable by the face modeler to generate a model of the face (e.g., a three-dimensional model of the face). In some implementations, the generated model of the face can be used to synthesize a controlled image or rendering of the face (e.g., a front-facing, evenly-lit image of the face with a neutral expression). In some implementations, values for one or more facial attributes (e.g., face shape, eye color, hair length, etc.) of the face can be ascertained from the model of the face and/or the rendered controlled image of the face. An artistic rendering of the face, such as, for example, personalized emojis, can be generated from the ascertained facial attribute values.

Thus, in some implementations, the systems and methods of the present disclosure can be implemented as a useful feature to provide an artistic rendering of the user's face if the user so chooses. For example, the systems and methods of the present disclosure can receive an input image uploaded by the user and, in response, provide the artistic rendering.

More particularly, the present disclosure provides systems and methods that can reconstruct a face given either a controlled image or an uncontrolled image of a face as an input. A controlled image can be an image that satisfies each of a number of desired factors. For example, controlled images can be images in which the image and/or subject exhibit neutral facial expression, front-facing pose (e.g., looking into the camera), even lighting, and/or other factors. This list of desired factors is provided as one example only.

On the other hand, an uncontrolled image can be an image that does not satisfy all of the number of desired factors. For example, uncontrolled images can be images in which the image and/or subject fails to exhibit neutral facial expression, front-facing pose, even lighting, and/or other factors. For example, a photograph of a person looking away from the camera in poor lighting conditions may be an uncontrolled photograph. The above list of desired factors is provided as one example only.

According to an aspect of the present disclosure, the systems and methods of the present disclosure can leverage the availability of high-power image recognition models. In some examples, an image recognition model can be a deep learning model (e.g., a deep convolutional network) that learns a mapping from images to a lower dimensional space. In some implementations, distances in the lower dimensional space can directly correspond to a measure of image similarity.

One example type of image recognition model is a face recognition model. Similar to the description above, a face recognition model can be a deep learning model (e.g., a deep convolutional network) that learns a mapping from images that depict faces to a lower dimensional space. Once this space has been produced, tasks such as face recognition, verification, and clustering can be implemented using standard techniques with embeddings as feature vectors.

One example of a face recognition model is described in F. Schroff, D. Kalenichenko, and J. Philben. FaceNet: A Unified Embedding for Face Recognition and Clustering. In *Proceedings of the IEEE Computer Society Conf. on CVPR*, 2015. The face recognition model described by this publication is provided as one example only. The present disclosure is not limited to the particular details of the particular face recognition model described by this publication. In some implementations in which the face recognition model described by this publication is used, the embedding can be obtained from a pooling layer (e.g., an average pooling layer) that is structurally positioned near the conclusion of a deep convolutional neural network portion of the face recognition model but prior to an $L_2$ Normalization layer of the face recognition model. For example, the embedding obtained from the pooling layer can be a 1024-dimensional vector.

Thus, an image recognition model can be a machine-learned model that can receive an image (e.g., that depicts a face) and, in response, produce (e.g., at an output layer or at an intermediate layer) an embedding in a lower dimensional space. This embedding can be useful for various tasks including, primarily, determining a measure of how similar the image shown in the input image is to other images. For example, a face recognition model can be used to determine a measure of how similar a first face shown in a first image is to other faces shown in other images.

However, due to the unique, opaque dimensional space in which the embedding produced by the image recognition model is expressed, the embedding is generally not humanly understandable or parseable. Stated differently, a human typically cannot review an embedding from an image recognition model and discern any discrete information regarding particular facial attributes such as, for example, eye color, hair length, etc. Therefore, embeddings from image recognition models have not typically been viewed as useful inputs for any kind of face reconstruction technique. As such, the present disclosure provides novel techniques and pipelines that make use of embeddings from image recognition models for face reconstruction purposes, thereby providing a technical solution to the technical problem of the perceived opaqueness of image recognition model embeddings.

In particular, according to another aspect, the present disclosure provides face reconstruction models that are capable of reconstructing a representation of a face from an embedding obtained from an image recognition model. In some implementations, the face reconstruction model can be structured as a translation model and a face modeler. In other implementations, the face reconstruction model can be structured as an autoencoder. For example, the autoencoder can be a variational autoencoder.

More particularly, in some implementations of the present disclosure, a small, lightweight, translation model can be structurally positioned between the image recognition model and a face modeler. The translation model can be a machine-learned model that is trained to receive the embedding generated by the image recognition model and, in response, output a plurality of facial modeling parameter values. In some implementations, the translation model can be a neural network, such as, for example a deep feed-forward neural network. As one particular non-limiting example, the translation model can be three-layer, fully connected neural network regression model.

According to another aspect, in some implementations of the present disclosure, the translation model can be trained on a set of training data that includes a plurality of example embeddings respectively labeled with a plurality of example facial modeling parameter values. In some implementations, to generate such set of training data, the systems and methods of the present disclosure can use a morphable model training set to generate faces that have different facial modeling parameter values. The face morphs can then be respectively input into the image recognition model to obtain a respective embedding for each face morph. Each embedding can be labeled with the respective facial modeling parameter values of the face morph used to obtain such embedding. Thus, a plurality of face morphs can be used to produce a plurality of example embeddings. The example embeddings can be respectively labeled with a plurality of example facial modeling parameter values respectively associated with the plurality of face morphs respectively used to generate the example embeddings. Using such training data, the translation model can be trained to convert an input embedding into facial modeling parameter values.

According to another aspect, in some implementations, a face modeler can use the plurality of facial modeling parameter values output by the translation model to generate a model of the face (e.g., a three-dimensional mesh model of the face). The face modeler can be any algorithm for creating a model or image of the face from the facial modeling parameter values.

More particularly, in some implementations, the face modeler can use a morphable face model to generate the model of the face based on the facial modeling parameter values. One example morphable face model can include a parameterization of face geometry in the form of two-dimensional landmark positions and a parameterization of face texture as a linear combination of one or more training images. In some implementations, the geometry and the texture coordinates can be compressed with principal components analysis (PCA).

In some implementations, the morphable face model can be generated from a plurality of training images (e.g., controlled training images). For example, in some embodiments, the image recognition model (e.g., face recognition model) may be designed to remove variation due to pose, lighting, and/or expression from the embedding. As such, the morphable model can be built from images where pose, lighting, and/or expression are constant. For example, training images can be used that have a subject that is front-facing with a neutral expression, under even, soft lighting. While any constant combination of pose, lighting, and expression could be used, the combination described above provides the most useful output for measuring resting facial attributes.

In some implementations, creation of the morphable face model from controlled training images can be performed as follows: 1. Compute facial landmarks for each training image; 2. Find an average set of facial landmarks (e.g., by summing over the landmarks of all training images; 3. Warp each training image to the average set of facial landmarks; 4. Concatenate the landmark positions and the warped images into two large matrices; and 5. Compute a decomposition (e.g., a PCA decomposition) for the landmark and image (geometry and texture) matrices. In some implementations, the landmark positions and the warped images concatenated into two large matrices of dimensions L×N and P×N, where L=number of landmarks*2, and P=number of pixels*3. In some implementations, the decomposition can be truncated after a sufficient accuracy is achieved. As one example, about 80 components can be kept for landmarks while about 2000 components are kept for image texture. The coordinates in the decomposition can form the facial modeling parameters of the morphable face model.

As noted above, the face modeler can use the morphable face model to generate a model of the face from a plurality of facial modeling parameter values (e.g., as provided by the translation model). In one example, generation of the model from the parameter values can be performed by first unprojecting the PCA values for the geometry and texture (e.g., by multiplying by the stored PCA basis matrices). This can produce a set of landmarks and a warped image. Next, the image can be unwarped by warping from the average landmarks to the reconstructed landmarks, thereby providing the model of the face.

In some implementations, the generated model of the face can be used to synthesize a controlled image or rendering of the face. For example, a renderer can use the model to render a front-facing, evenly-lit image of the face with a neutral expression. In some implementations, values for one or more facial attributes (e.g., face shape, eye color, hair length, etc.) of the face can be ascertained from the model of the face and/or the rendered controlled image of the face.

According to another aspect of the present disclosure, in some implementations, the face reconstruction model can be structured as an autoencoder, such as, for example, a variational autoencoder. For example, the autoencoder (e.g., variational autoencoder) can receive the embedding from the image recognition model and can output a model of the face and/or a rendering of the face (e.g., a controlled rendering). Thus, the autoencoder can simultaneously learn to perform the functions attributed to the translation model and the face modeler/renderer above. One benefit associated with use of an autoencoder is improved results for certain facial attributes, such as, for example, hair. However, with use of an autoencoder, the explicit facial modeling parameter values are generally not available.

Thus, the present disclosure provides systems and methods that can generate a model of a face (e.g., a three-dimensional model of the face) and/or a rendering of a face (e.g., a controlled rendering) based on an input image of the face (e.g., an uncontrolled image of the face). The model and/or rendering can be used for a number of different uses. As one example, the model and/or rendering can be used to generate a stylized cartoon of the face (e.g., a personalized emoji). As another example, the model can be used to generate realistic three-dimensional renderings of the face for use as an avatar in a virtual reality environment (e.g., to represent a user participating in a multi-user virtual reality or gaming environment). As yet another example, the facial modeling parameter values can be used to compare the appearance similarity between two people (e.g., an application that finds a celebrity that looks like the user based on facial modeling parameter values). Further, since some implementations of the present disclosure can generate a controlled rendering based on an uncontrolled image, any techniques or uses that are thought to be applicable only to controlled images can now be extended to uncontrolled images as well.

Thus, the present disclosure provides systems and methods that leverage deep learning and novel processing pipelines to perform facial reconstruction and, in some implementations, automatic determination of facial attribute values based on an input image of a face.

In particular, according to an aspect of the present disclosure, in some implementations, the systems and methods described herein can perform facial reconstruction and/or automatic determination of attribute values in a feed-forward (e.g., non-iterative) manner, which can reduce the amount of time and processing power required to perform the face reconstruction. Thus, the systems and methods of the present disclosure provide a technical solution that eliminates the undesirable reliance of facial reconstruction techniques on iterative optimization and/or use of an undesirably large training set of images and facial modeling parameters. As such, the technical benefits of improved processing time and reduced processing cost are provided.

In addition, the systems and methods of the present disclosure are particularly beneficial due to their robustness relative to uncontrolled imagery. More particularly, as stated above, the systems and methods of the present disclosure are robust and can use both a controlled image and/or an uncontrolled image as an input.

Many existing reconstruction techniques and/or attribute measurement techniques are not robust against uncontrolled imagery and perform poorly when given an uncontrolled image as an input. However, the systems and methods of the present disclosure can use either a controlled image or an uncontrolled image as an input, with similar quality results. Thus, the systems and methods of the present disclosure provide a technical solution that enables facial reconstruction and/or the automatic generation of accurate values for facial attributes based on an uncontrolled image of a face. As such, a technical benefit of improved robustness to uncontrolled imagery is provided.

With reference now to the Figures, example embodiments of the present disclosure will be discussed in further detail.

Example Use Cases

The present disclosure provides systems and methods that can generate a reconstructed representation of a face based on an image of a face. For example, the reconstructed representation can be a three-dimensional model of the face or a two-dimensional rendering of the face (e.g., a controlled rendering of the face). The reconstructed representation can be used for a number of purposes, including, as examples, determining values for one or more attributes of the face and/or generating an artistic rendering of the face.

As one example, the artistic rendering of the face can be a stylized cartoon of the face (e.g., a personalized emoji). As another example, a three-dimensional model can be used to generate realistic renderings of the face for use as an avatar in a virtual reality environment (e.g., to represent a user participating in a multi-user virtual reality or gaming environment). As yet another example, facial modeling parameter values generated by the systems and methods of the present disclosure can be used to compare the appearance similarity between two people. For example, a computer application can use the facial modeling parameter values or the determined attribute values to identify a celebrity that looks like a user who has uploaded an image of herself. Further, since some implementations of the present disclosure can generate a controlled rendering based on an uncontrolled image, any techniques or uses that are applicable only to controlled images can now be extended to uncontrolled images as well.

As one illustrated example, FIG. 1A depicts an example use of a face reconstruction system 20 to generate example artistic renderings 30 from an example image 10 according to example embodiments of the present disclosure. In particular, as illustrated, the artistic renderings 30 can be personalized emojis that approximate, in a cartoon fashion, the face depicted by the image 10. The image 10 can be a controlled image or an uncontrolled image.

Thus, the face reconstruction system 20 can be implemented as a useful feature to provide personalized emojis 30 if the user so chooses. For example, the user can choose to upload an image 10 of herself to receive the personalized emojis 30.

Example Systems

Figure 1B:
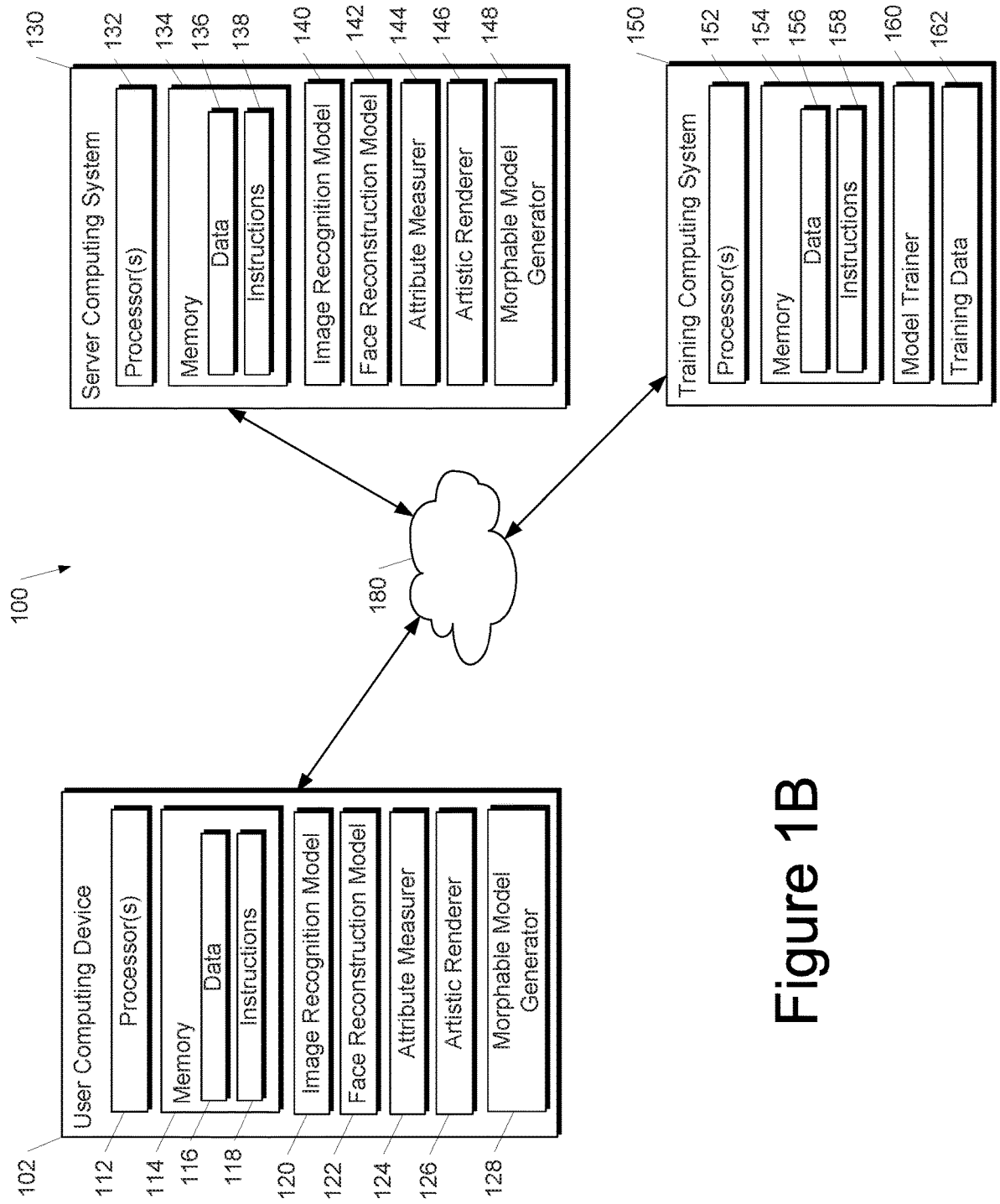
FIG. 1B depicts a block diagram of an example computing system according to example embodiments of the present disclosure.

FIG. 1B depicts a block diagram of an example computerized face reconstruction system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, a GPU, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations. In some implementations, the data 116 can include an image stored by the user. In some implementations, the data 116 can include a morphable face model.

The user computing device 102 can store or include one or more models or other components for performing face reconstruction and rendering. In particular, as examples, in some implementations, the user computing device 102 can include some or all of the following: an image recognition model 120, a face reconstruction model 122, an attribute measurer 124, an artistic renderer 126, and a morphable model generator 128. In other implementations, some or all of these components are located only at the server computing system 130 (e.g., as illustrated by components 140-148).

In some implementations, some or all of components 120-128 (or sub-component portions thereof) can be machine-learned. Example structures for and functionality of these components 120-128 is further described with reference to like-named components in FIGS. 2-6. Likewise, various of these components 120-128 can be implemented to perform various aspects of the example methods 700-1000 of FIGS. 7-10. For example, morphable model generator 128 can be implemented to perform 1000 of FIG. 10 to generate a morphable face model.

In some implementations, some or all of the components 120-128 can be received by the user computing device 102 from the server computing system 130 over network 180, stored in the user computing device memory 114, and the used or otherwise implemented by the one or more processors 112. In some implementations, one or more machine-learned portions of the components 120-128 can be trained by training computing system 150 (e.g., in cooperation with server computing system 130) and then provided to the user computing device 102 (e.g., by server computing system 130 over network 180).

The server computing system 130 includes one or more processors 132 and a memory 134. The one or more processors 132 can be any suitable processing device (e.g., a processor core, a microprocessor, an ASIC, a FPGA, a controller, a microcontroller, a GPU, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations. In some implementations, the data 136 can include an image uploaded by the user. In some implementations, the data 136 can include a morphable face model.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The server computing system 130 can store or include one or more models or other components for performing face reconstruction and rendering. In particular, as examples, in some implementations, the server computing system 130 can include some or all of the following: an image recognition model 140, a face reconstruction model 142, an attribute measurer 144, an artistic renderer 146, and a morphable model generator 148. In other implementations, some or all of these components are located only at the user computing device 102 (e.g., as illustrated by components 120-128). Various combinations of different components can be located in various different locations.

In some implementations, some or all of components 140-148 (or sub-component portions thereof) can be machine-learned. Example structures for and functionality of these components 140-148 is further described with reference to like-named components in FIGS. 2-6. Likewise, various of these components 140-148 can be implemented to perform various aspects of the example methods 700-1000 of FIGS. 7-10. For example, morphable model generator 148 can be implemented to perform 1000 of FIG. 10 to generate a morphable face model.

In some implementations, one or more machine-learned portions of the components 140-148 can be trained by training computing system 150 (e.g., in cooperation with server computing system 130). Thus, in some implementations, the server computing system 130 can train one or more machine-learned portions of the components 140-148 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains machine-learned models using various training or learning techniques, such as, for example, backwards propagation of errors. The model trainer 160 can perform a number of generalization techniques (e.g., weight decays, dropouts, etc.) to improve the generalization capability of the models being trained.

In particular, the model trainer 160 can train one or more machine-learned models based on a set of training data 162.

Figure 9:
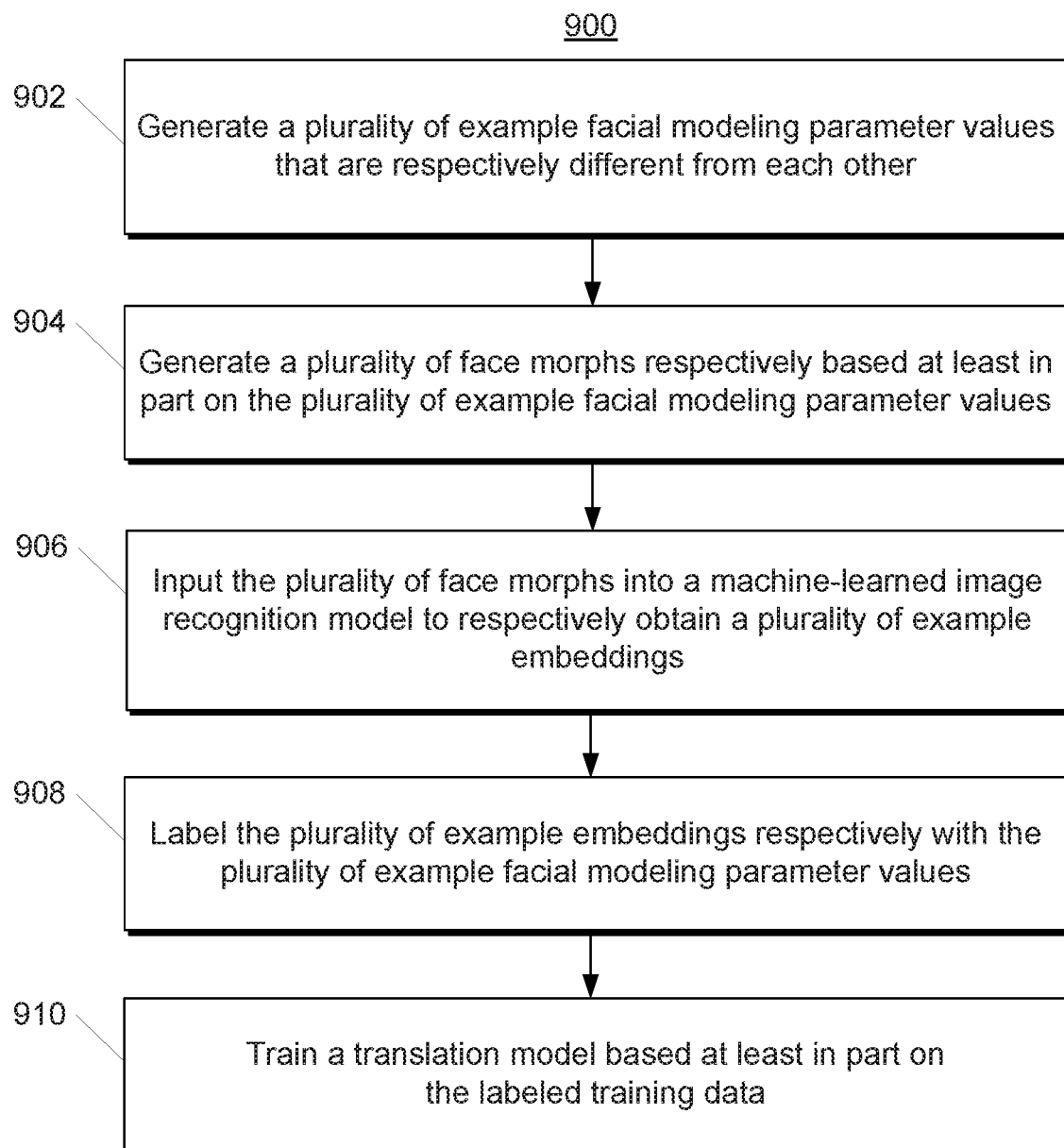
FIG. 9 depicts a flowchart diagram of an example method to train a translation model according to example embodiments of the present disclosure.

In some implementations, model trainer 160 can perform example method 900 of FIG. 9 to generate the training data 162 and/or train a machine-learned translation model that is included in some implementations of the face reconstruction model 122, 142.

In some implementations, some or all of the image recognition model 120, 140, the face reconstruction model 122, 142, the attribute measurer 142, 144, the artistic renderer 126, 146, the morphable model generator 128, 148, and the model trainer 160 include computer logic utilized to provide desired functionality. Some or all of the image recognition model 120, 140, the face reconstruction model 122, 142, the attribute measurer 142, 144, the artistic renderer 126, 146, the morphable model generator 128, 148, and the model trainer 160 can be implemented in hardware, firmware, and/or software controlling a general purpose processor. For example, in some implementations, some or all of the image recognition model 120, 140, the face reconstruction model 122, 142, the attribute measurer 142, 144, the artistic renderer 126, 146, the morphable model generator 128, 148, and the model trainer 160 include program files stored on a storage device, loaded into a memory and executed by one or more processors. In other implementations, some or all of the image recognition model 120, 140, the face reconstruction model 122, 142, the attribute measurer 142, 144, the artistic renderer 126, 146, the morphable model generator 128, 148, and the model trainer 160 include one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1B illustrates one example computing system that can be used to implement the present disclosure. Other computing systems can be used as well. For example, in some implementations, the user computing device can include the model trainer 160 and the training data 162. In such implementations, the image recognition model and/or face reconstruction model can be both trained and used locally at the user computing device.

Example Pipelines and Model Arrangements

Figure 2:
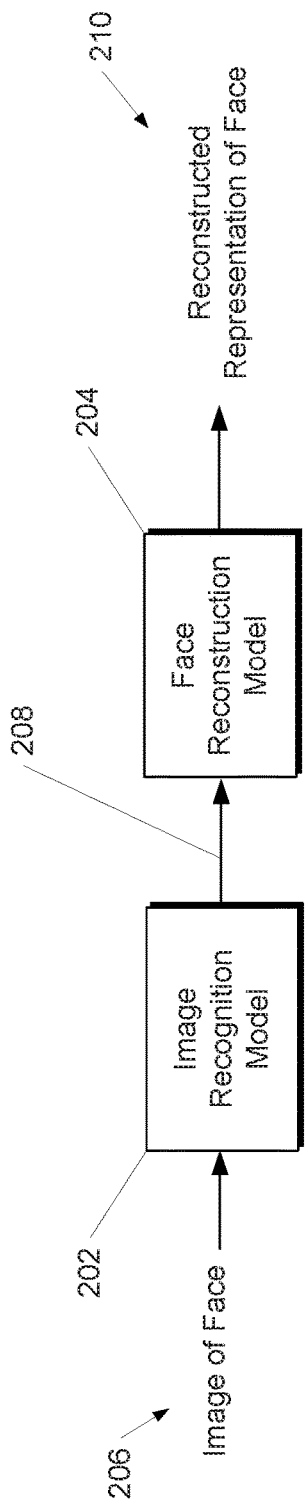
FIG. 2 depicts a block diagram of an example face reconstruction pipeline according to example embodiments of the present disclosure.

FIG. 2 depicts a block diagram of an example face reconstruction pipeline according to example embodiments of the present disclosure. The example pipeline includes an image recognition model 202 and a face reconstruction model 204. The example pipeline of FIG. 2 starts with an image 206 of a face. For example, the image 206 can be uploaded by a user that desires, for example, an artistic representation of his face.

The image recognition model 202 can receive the image 206 and, in response, supply an embedding 208. In some examples, the image recognition model 202 can be a deep learning model (e.g., a deep convolutional network) that learns a mapping from images to a lower dimensional space. In some implementations, distances in the lower dimensional space can directly correspond to a measure of image similarity. The embedding 208 can be supplied at an output layer of the image recognition model 202 or at an intermediate layer (e.g., a pooling layer).

In some examples, the image recognition model 202 can be a face recognition model. Similar to the description above, a face recognition model can be a deep learning model (e.g., a deep convolutional network) that learns a mapping from images that depict faces to a lower dimensional space. One example of a face recognition model is described in F. Schroff, D. Kalenichenko, and J. Philben. FaceNet: A Unified Embedding for Face Recognition and Clustering. In *Proceedings of the IEEE Computer Society Conf. on CVPR,* 2015. The face recognition model described by this publication is provided as one example only. The present disclosure is not limited to the particular details of the particular face recognition model described by this publication. In some implementations in which the face recognition model described by this publication is used, the embedding can be obtained from a pooling layer (e.g., an average pooling layer) that is structurally positioned near the conclusion of a deep convolutional neural network portion of the face recognition model but prior to an $L_2$ Normalization layer of the face recognition model. For example, the embedding obtained from the pooling layer can be a 1024-dimensional vector.

The face reconstruction model 204 can receive the embedding 208 and, in response, output a reconstructed representation 210 of the face. As examples, the reconstructed representation 210 of the face can be a model of the face (e.g., a three-dimensional model) or a rendering of the face (e.g., a controlled rendering). In some implementations, the face reconstruction model 204 can be structured as a translation model and a face modeler. In other implementations, the face reconstruction model can be structured as a autoencoder. For example, the autoencoder can be an autoencoder.

Figure 3:
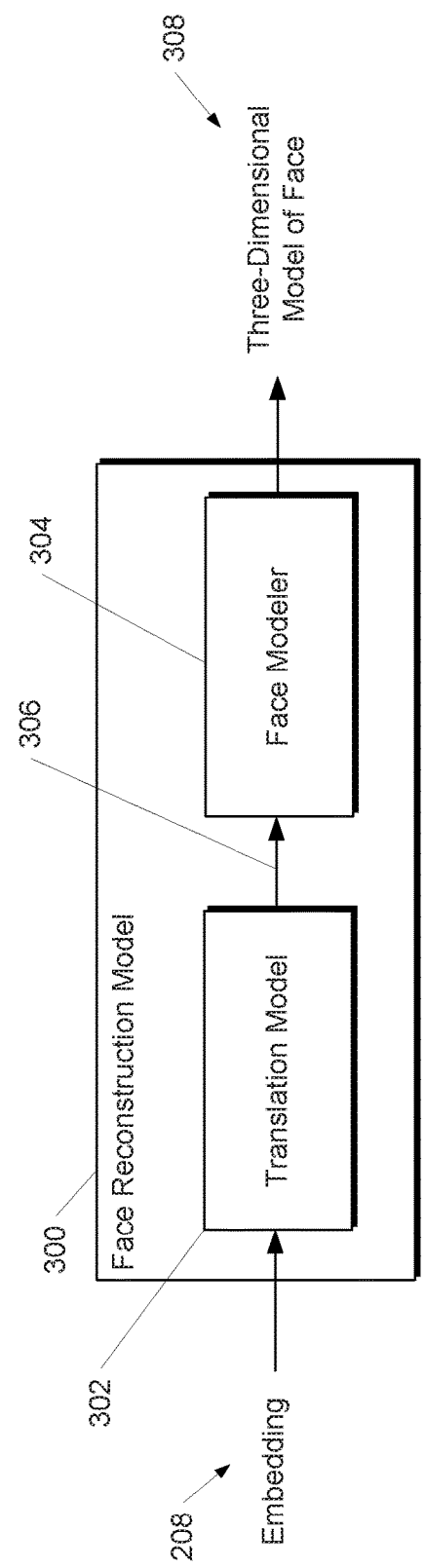
FIG. 3 depicts a block diagram of an example face reconstruction model according to example embodiments of the present disclosure.

As an example, FIG. 3 depicts a block diagram of an example face reconstruction model 300 according to example embodiments of the present disclosure. The face reconstruction model 300 includes a translation model 302 and a face modeler 304.

In some implementations, the translation model 302 can be a machine-learned model that is trained to receive the embedding 208 generated by the image recognition model 202 and, in response, output a plurality of facial modeling parameter values 306. In some implementations, the translation model 302 can be a neural network, such as, for example a deep feed-forward neural network. As one particular non-limiting example, the translation model can be three-layer, fully connected neural network regression model.

In some implementations of the present disclosure, the translation model 302 can be trained on a set of training data that includes a plurality of example embeddings respectively labeled with a plurality of example facial modeling parameter values. In some implementations, to generate such a set of training data, the systems and methods of the present disclosure can use a morphable model training set to generate faces that have different facial modeling parameter values. The face morphs can then be respectively input into the image recognition model 202 to obtain a respective embedding for such face morph. Each embedding can be labeled with the respective facial modeling parameter values of the face morph used to obtain such embedding. Thus, a plurality of face morphs can be used to produce a plurality of example embeddings. The example embeddings can be respectively labeled with a plurality of example facial modeling parameter values respectively associated with the plurality of face morphs respectively used to generate the example embeddings.

The face modeler 304 can use the plurality of facial modeling parameter values 306 output by the translation model 302 to generate a model 308 of the face (e.g., a three-dimensional model of the face). The face modeler 304 can be any algorithm for creating a model or image of the face from the facial modeling parameter values.

More particularly, in some implementations, the face modeler 304 can use a morphable face model to generate the model 308 of the face based on the facial modeling parameter values 306. One example morphable face model can include a parameterization of face geometry in the form of two-dimensional landmark positions and a parameterization of face texture as a linear combination of one or more training images. In some implementations, the geometry and the texture coordinates can be compressed with principal components analysis (PCA).

In some implementations, the morphable face model can be generated from a plurality of controlled training images. For example, in some embodiments, the image recognition model 202 (e.g., face recognition model) may be designed to remove variation due to pose, lighting, and/or expression from the embedding. As such, the morphable model can be built from images where pose, lighting, and/or expression are constant. For example, training images can be used that have a subject that is front-facing with a neutral expression, under even, soft lighting. While any constant combination of pose, lighting, and expression could be used, the combination described above provides the most useful output for measuring resting facial attributes.

In some implementations, creation of the morphable face model from controlled training images can be performed as follows: 1. Compute facial landmarks for each training image; 2. Find an average set of facial landmarks (e.g., by summing over the landmarks of all training images; 3. Warp each training image to the average set of facial landmarks; 4. Concatenate the landmark positions and the warped images into two large matrices; and 5. Compute the PCA decomposition for the landmark and image (geometry and texture) matrices. In some implementations, the landmark positions and the warped images concatenated into two large matrices of dimensions L×N and P×N, where L=number of landmarks*2, and P=number of pixels*3. In some implementations, the PCA decomposition can be truncated after a sufficient accuracy is achieved. As one example, about 80 components can be kept for landmarks while about 2000 components are kept for image texture. The coordinates in the PCA decomposition can form the facial modeling parameters of the morphable face model.

As noted above, the face modeler 304 can use the morphable face model to generate a model 308 of a face from the plurality of facial modeling parameter values 306 provided by the translation model 302. In one example, generation of the model 308 from the parameter values 306 can be performed by first unprojecting the PCA values for the geometry and texture (e.g., by multiplying by the stored PCA basis matrices). This can produce a set of landmarks and a warped image. Next, the image can be unwarped by warping from the average landmarks to the reconstructed landmarks, thereby providing the model of the face. In other implementations, the face modeler 304 can be structured as a neural network.

Figure 4:
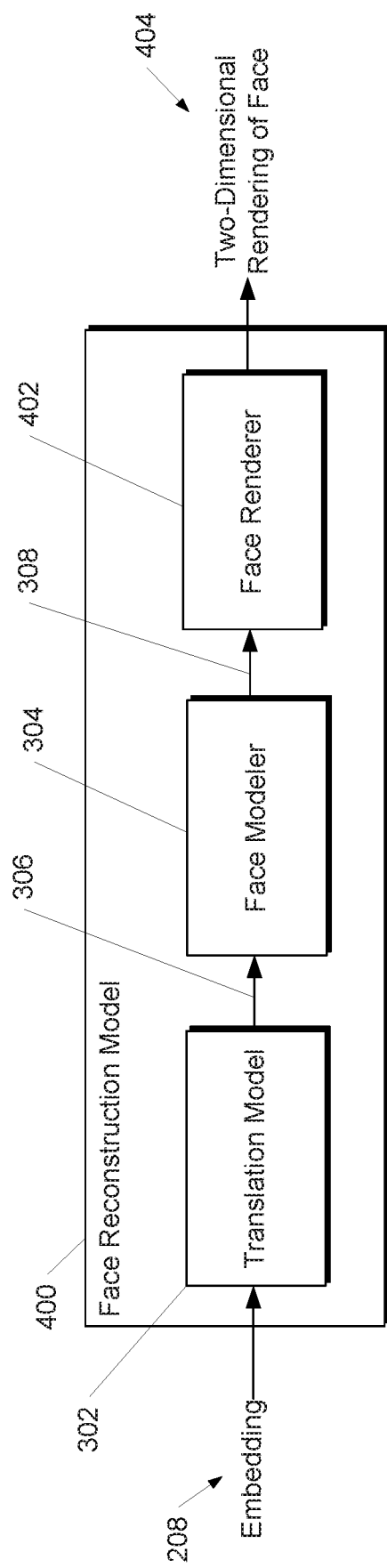
FIG. 4 depicts a block diagram of an example face reconstruction model according to example embodiments of the present disclosure.

In some implementations, the generated model 308 of the face can be used to synthesize a controlled image or rendering of the face. As an example, FIG. 4 depicts a block diagram of an example face reconstruction model 400 according to example embodiments of the present disclosure. The face reconstruction model 400 is similar to the face reconstruction model 300 of FIG. 300, except that the face reconstruction model 400 further includes a face renderer 402. The face renderer 402 can use the model 308 provided by the face modeler 304 to render a two-dimensional rendering 404 of the face. For example, the two-dimensional rendering 404 of the face can be a controlled rendering (e.g., a front-facing, evenly-lit image of the face with a neutral expression).

Figure 5:
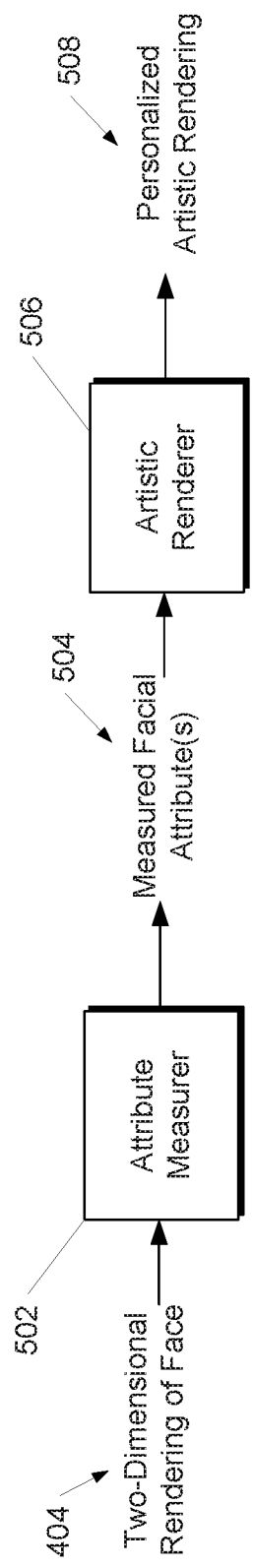
FIG. 5 depicts a block diagram of an example artistic rendering pipeline according to example embodiments of the present disclosure.

In some implementations, values for one or more facial attributes of the face can be ascertained from the model 308 of the face and/or the rendered image 404 of the face. As an example, FIG. 5 depicts a block diagram of an example artistic rendering pipeline according to example embodiments of the present disclosure. The example pipeline of FIG. 5 includes an attribute measurer 502 and an artistic renderer 506.

The attribute measurer 502 can receive the two-dimensional rendering 404 of the face and, in response, output one or more measured facial attributes 504. In some implementations, the attribute measurer 502 can include one or more machine-learned classifiers or regression models that output measures of the various facial attributes 504. For example, the machine-learned classifiers or regression models can be trained on training images that have been manually labelled with ground truth values for the facial attributes. Alternatively or additionally, certain attributes can be measured directly from the two-dimensional rendering. Example facial attributes include tone; facial hair; jaw shape; hair color; hair style; face width/proportions; eye, nose, and/or mouth shape; expression; fine-grained features such as wrinkles; and/or other facial attributes.

The artistic renderer 506 can receive the measured facial attributes 504 and, in response, output an artistic rendering 508 of the face. In one example, the artistic renderer 506 can select certain predefined attribute templates on the basis of the measured facial attributes 504. The selected attribute templates can be combined to generate the artistic rendering 508. In one example, the artistic rendering 508 can be personalized emojis.

Figure 6:
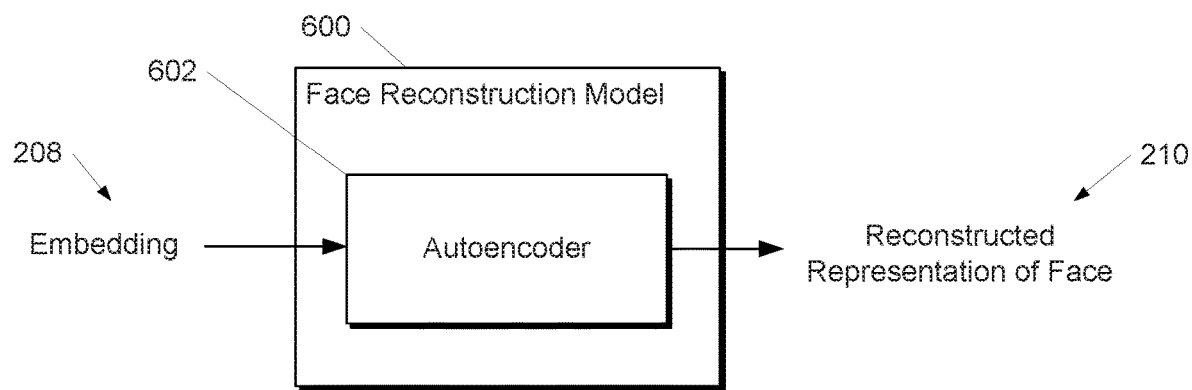
FIG. 6 depicts a block diagram of an example face reconstruction model according to example embodiments of the present disclosure.

FIG. 6 depicts a block diagram of an alternative example face reconstruction model 600 according to example embodiments of the present disclosure. The face reconstruction model 600 includes an autoencoder, such as, for example, an autoencoder 602, as illustrated. For example, the autoencoder 602 can be a variational autoencoder.

The autoencoder 602 can receive the embedding 208 from the image recognition model 202 and can output the reconstructed representation 210 of the face. The reconstructed representation 210 of the face can be a model of the face and/or a controlled image of the face. Thus, the autoencoder 602 can simultaneously learn to perform the functions attributed to the translation model and the face modeler/renderer above. One benefit associated with use of an autoencoder is improved results for certain facial features, such as, for example, hair. However, with use of an autoencoder, the explicit facial modeling parameter values are generally not available.

Example Methods

Figure 7:
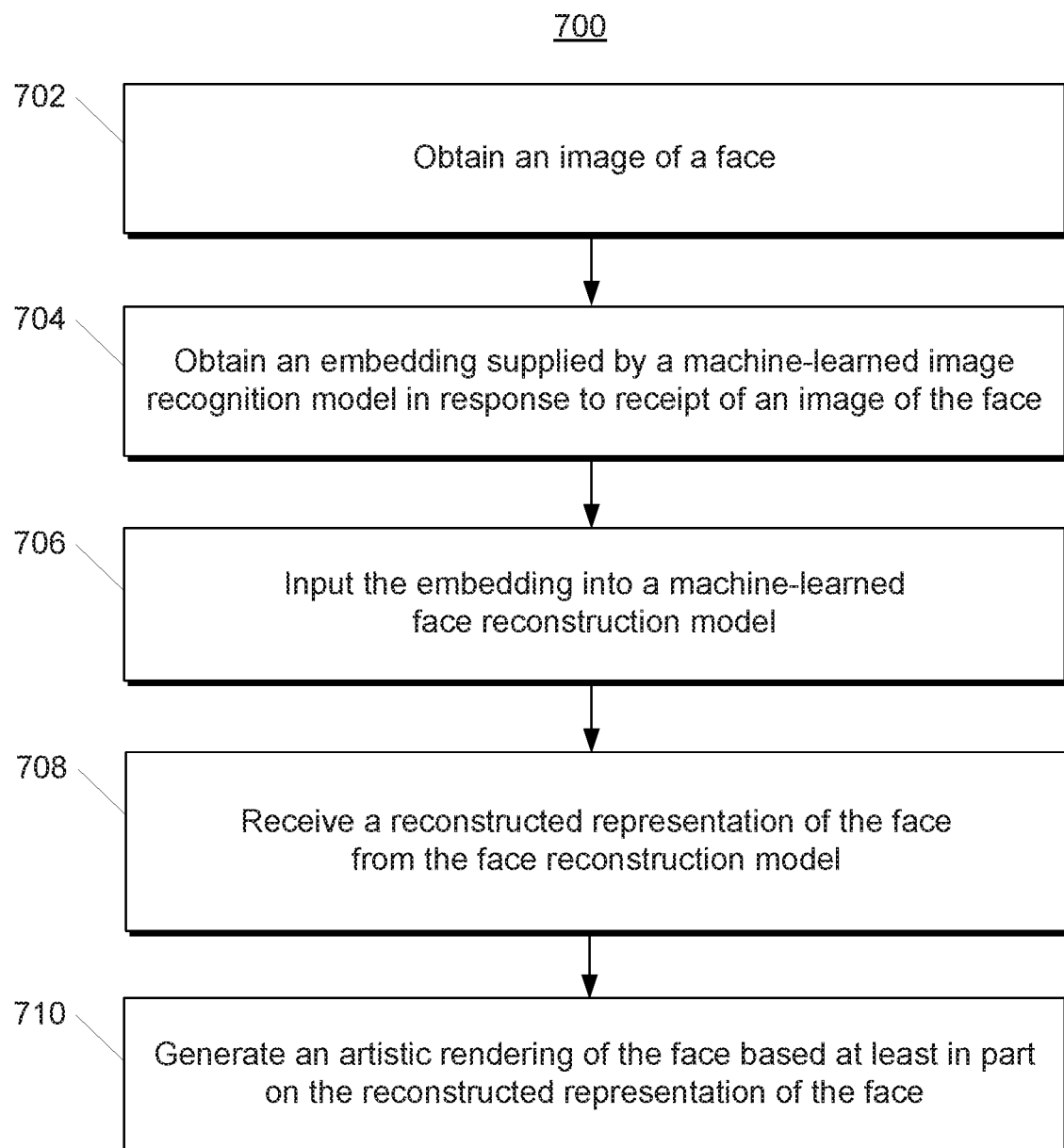
FIG. 7 depicts a flowchart diagram of an example method to generate an artistic rendering of a face from an image of the face according to example embodiments of the present disclosure.

FIG. 7 depicts a flowchart diagram of an example method 700 to generate an artistic rendering of a face from an image of the face according to example embodiments of the present disclosure.

At 702, a computing system obtains an image of a face. For example, the image can be uploaded or otherwise selected by a user. The image can be a controlled image or an uncontrolled image.

At 704, the computing system obtains an embedding supplied by a machine-learned image recognition model in response to receipt of the image of the face. For example, the embedding can be supplied by the machine-learned image recognition model at an output layer or an intermediate layer (e.g., a pooling layer). For example, the image recognition model can be a face recognition model.

At 706, the computing system inputs the embedding into a machine-learned face reconstruction model. In some implementations, the face reconstruction model can be structured as a translation model and a face modeler. In other implementations, the face reconstruction model can be structured as an autoencoder. For example, the autoencoder can be a variational autoencoder.

At 708, the computing system receives a reconstructed representation of the face from the face reconstruction model. As examples, the reconstructed representation of the face can be a model of the face (e.g., a three-dimensional model) or a rendering of the face (e.g., a controlled rendering).

At 710, the computing system generates an artistic rendering of the face based at least in part on the reconstructed representation of the face. As one example, the artistic rendering of the face can be a stylized cartoon of the face (e.g., a personalized emoji). As another example, a three-dimensional model can be used to generate realistic renderings of the face for use as an avatar in a virtual reality environment (e.g., to represent a user participating in a multi-user virtual reality or gaming environment).

Figure 8:
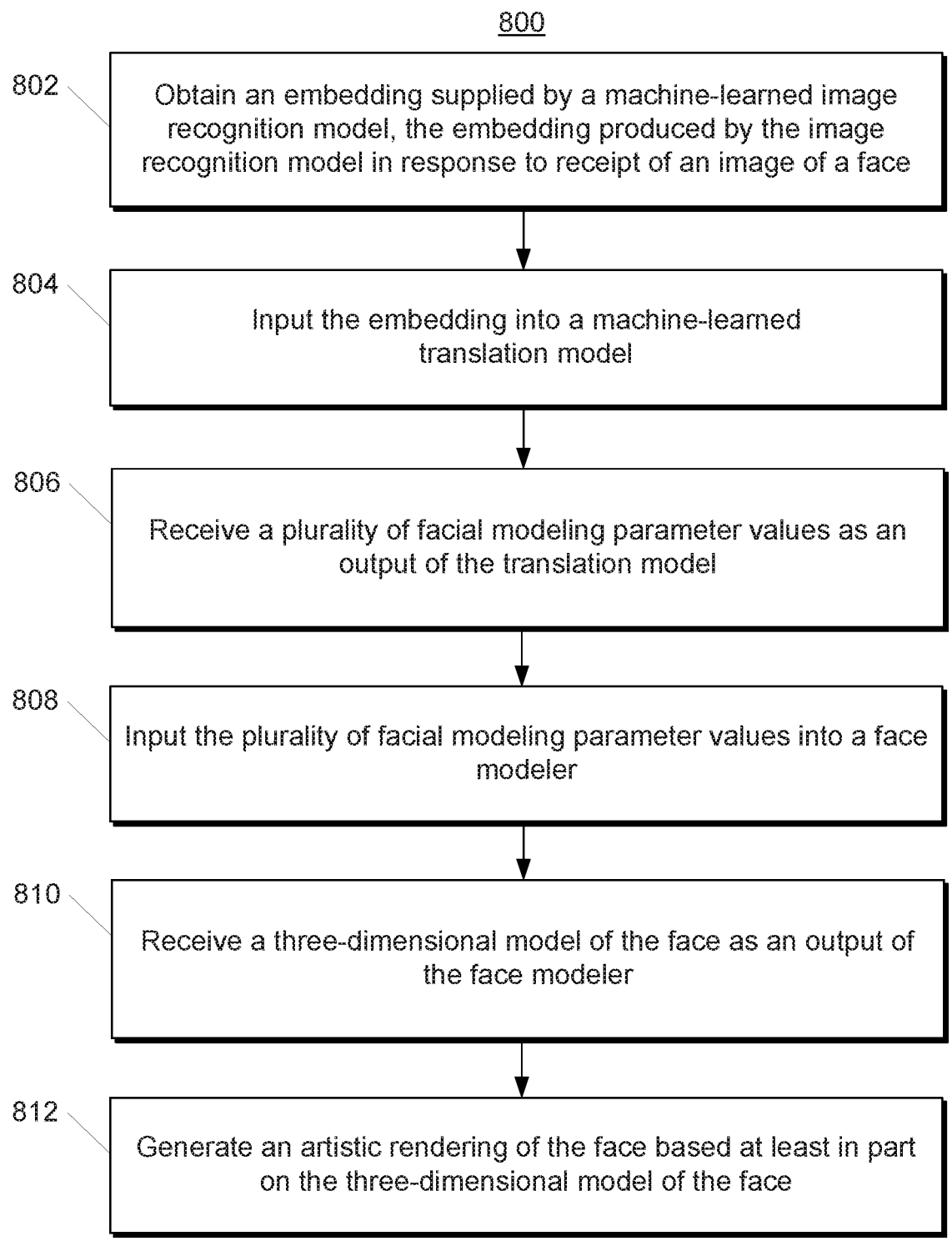
FIG. 8 depicts a flowchart diagram of an example method to generate an artistic rendering of a face from an embedding according to example embodiments of the present disclosure.

FIG. 8 depicts a flowchart diagram of an example method 800 to generate an artistic rendering of a face from an embedding according to example embodiments of the present disclosure.

At 802, a computing system obtains an embedding supplied by a machine-learned image recognition model. The image recognition model produced the embedding in response to receipt of an image of a face. For example, the embedding can be supplied by the machine-learned image recognition model at an output layer or an intermediate layer (e.g., a pooling layer). For example, the image recognition model can be a face recognition model.

At 804, the computing system inputs the embedding into a machine-learned translation model. In some implementations, the translation model can be a machine-learned model that is trained to receive the embedding generated by the image recognition model and, in response, output a plurality of facial modeling parameter values. In some implementations, the translation model can be a neural network, such as, for example a deep feed-forward neural network. As one particular non-limiting example, the translation model can be three-layer, fully connected neural network regression model.

At 806, the computing system receives a plurality of facial modeling parameter values as an output of the translation model. At 808, the computing system inputs the plurality of facial modeling parameters into a face modeler. The face modeler can use the plurality of facial modeling parameter values output by the translation model to generate a model of the face (e.g., a three-dimensional model of the face). The face modeler can be any algorithm for creating a model or image of the face from the facial modeling parameter values. More particularly, in some implementations, the face modeler can use a morphable face model to generate the model of the face based on the facial modeling parameter values 306.

At 810, the computing system receives a three-dimensional model of the face as an output of the face modeler. At 812, the computing system generates an artistic rendering of the face based at least in part on the three-dimensional model.

FIG. 9 depicts a flowchart diagram of an example method 900 to train a translation model according to example embodiments of the present disclosure.

At 902, a computing system generates a plurality of example facial modeling parameter values that are respectively different from each other.

In some implementations, the computing system can generate the plurality of example facial modeling parameter values from one or more seed images. For example, the computing system can generate the plurality of example facial modeling parameters values in the following manner: 1. Randomly select a training image; 2. Identify the k nearest neighbors of the selected training image in the morphable model's parameter space; 3. Select p<k of those neighbors to morph between; 4. Randomly select p+1 morphing weights (e.g., for the p neighbors plus the original image) that sum to 1; 5. Compute the weighted sum of the parameters. In some implementations, the operations described immediately above can be performed a plurality of times using a plurality of different seed training images to generate the plurality of example facial modeling parameter values.

At 904, the computing system generates a plurality of face morphs respectively based at least in part on the plurality of example facial modeling parameter values. For example, a face modeler and/or face renderer can be used to generate the face morphs from the plurality of example facial modeling parameter values. In some implementations, the face morphs can be controlled two-dimensional renderings of faces described by the plurality of example facial modeling parameter values.

At 906, the computing system inputs the plurality of face morphs into a machine-learned image recognition model to respectively obtain a plurality of example embeddings. At 908, the computing system labels the plurality of example embeddings respectively with the plurality of example facial modeling parameter values.

At 910, the computing system trains a translation model based at least in part on the labeled training data. For example, backwards propagation of errors can be used to train a neural network on the labeled training data.

Figure 10:
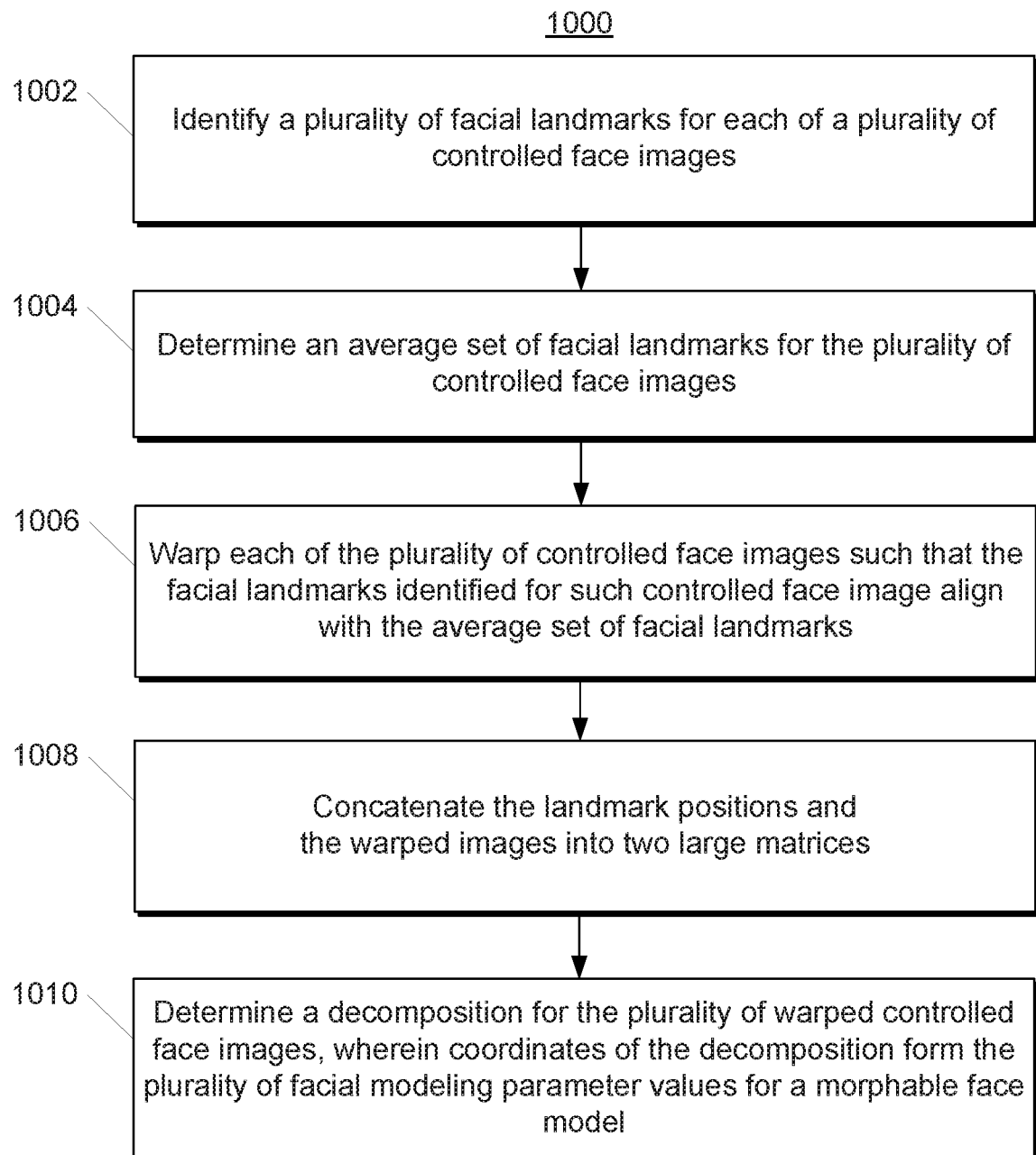
FIG. 10 depicts a flowchart diagram of an example method to generate a morphable face model according to example embodiments of the present disclosure.

FIG. 10 depicts a flowchart diagram of an example method 1000 to generate a morphable face model according to example embodiments of the present disclosure.

At 1002, a computing system identifies a plurality of facial landmarks for each of a plurality of controlled face images. For example a mobile vision service can be used (e.g., via an API) to identify the facial landmarks.

At 1004, the computing system determines an average set of facial landmarks for the plurality of controlled face images. For example, determining the average can include summing over the landmarks of all the training images.

At 1006, the computing system warps each of the plurality of controlled face images such that the facial landmarks identified for such controlled face image align with the average set of facial landmarks. This can align the facial features of all training images.

At 1008, the computing system concatenates the landmark positions and the warped images into two large matrices. For example, in some implementations, the landmark positions and the warped images concatenated into two large matrices of dimensions L×N and P×N, where L=number of landmarks*2, and P=number of pixels*3.

At 1010, the computing system determines a decomposition for the plurality of warped controlled face images. The coordinates of the decomposition can form the plurality of facial modeling parameter values for a morphable face model. In one example, determining the decomposition at 1008 includes determining a principal component analysis (PCA) decomposition for the two matrices generated at 1008. In some implementations, the decomposition can be truncated after a sufficient accuracy is achieved. As one example, about 80 components can be kept for landmarks while about 2000 components are kept for image texture.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 7-10 respectively depict steps performed in a particular order for purposes of illustration and discussion, the methods of the present disclosure are not limited to the particularly illustrated order or arrangement. The various steps of the methods 700-1000 can be omitted, rearranged, combined, and/or adapted in various ways without deviating from the scope of the present disclosure.

What is claimed is:

1. A computer-implemented method to obtain facial attribute data of a face, the method comprising:
   obtaining, by one or more computing devices, an image of a face;
   obtaining, by the one or more computing devices, an embedding supplied by a machine-learned image recognition model, the embedding supplied by the machine-learned image recognition model in response to receipt of the image of the face by the image recognition model;
   inputting, by the one or more computing devices, the embedding into a machine-learned translation model trained on a set of training data that includes a plurality of example embeddings labeled with a plurality of example facial modeling parameter values usable by a face modeler to generate a model of a face, wherein the example embeddings are obtained by inputting example faces into the machine-learned image recognition model, said example faces being generated by the face modeler using the respective example facial modeling parameter values;
   receiving, by the one or more computing devices, a plurality of facial modeling parameter values as an output of the translation model, the plurality of facial modeling parameter values descriptive of a plurality of facial attributes of the face obtained by the one or more computing devices; and
   inputting, by the one or more computing devices, the plurality of facial modeling parameter values into said face modeler; and
   receiving, by the one or more computing devices, a model of the face as an output of the face modeler.

2. The computer-implemented method of claim 1, wherein:
   obtaining, by the one or more computing devices, the image of the face comprises obtaining, by the one or more computing devices, an uncontrolled image of the face; and
   obtaining, by the one or more computing devices, the embedding comprises obtaining, by the one or more computing devices, the embedding supplied by the machine-learned image recognition model in response to receipt of the uncontrolled image of the face by the image recognition model.

3. The computer-implemented method of claim 1, further comprising:
   generating, by the one or more computing devices, an artistic rendering of the face based at least in part on the model of the face.

4. The computer-implemented method of claim 3, wherein generating, by the one or more computing devices, the artistic rendering of the face comprises:
   inputting, by the one or more computing devices, the model into a face renderer; and
   receiving, by the one or more computing devices, a controlled rendering of the face as an output of the face renderer.

5. The computer-implemented method of claim 4, further comprising:
   ascertaining, by the one or more computing devices, values for one or more of the plurality of facial attributes directly from the controlled rendering of the face.

6. The computer-implemented method of claim 1, wherein obtaining, by the one or more computing devices, the embedding supplied by the machine-learned image recognition model comprises obtaining, by the one or more computing devices, the embedding supplied by the machine-learned image recognition model at a hidden layer of the machine-learned image recognition model.

7. The computer-implemented method of claim 1, wherein obtaining, by the one or more computing devices, the embedding supplied by the machine-learned image recognition model comprises:
   inputting, by the one or more computing devices, the image of the face into the machine-learned image recognition model; and
   receiving, by the one or more computing devices, the embedding from the machine-learned image recognition model.

8. The computer-implemented method of claim 1, further comprising:

training, by the one or more computing devices, the translation model based on a set of training data that comprises a plurality of example embeddings respectively labeled with a plurality of example facial modeling parameter values.

9. The computer-implemented method of claim 8, further comprising:
generating, by the one or more computing devices, the set of training data, wherein generating the set of training data comprises:
generating, by the one or more computing devices, the plurality of example facial modeling parameter values, the plurality of example facial modeling parameter values different from each other;
generating, by the one or more computing devices, a plurality of face morphs respectively based at least in part on the plurality of example facial modeling parameter values;
inputting, by the one or more computing devices, the plurality of face morphs into the machine-learned image recognition model to respectively obtain the plurality of example embeddings;
labeling, by the one or more computing devices, the plurality of example embeddings respectively with the plurality of example facial modeling parameter values.

10. A computing system configured to obtain facial attribute data from an image of a face, the computing system comprising:
at least one processor;
a face modeler that is operable to receive a plurality of facial modeling parameter values and, in response to receipt of the plurality of facial modeling parameter values, output a model of a face;
a machine-learned translation model trained on a set of training data that includes a plurality of example embeddings labeled with a plurality of example facial modeling parameter values usable by the face modeler, wherein the example embeddings are obtained by inputting example faces into a machine-learned image recognition model, said example faces being generated by the face modeler using the respective example facial modeling parameter values, and
wherein the machine-learned translation model is operable to receive an embedding obtained from the machine-learned image recognition model and, in response to receipt of the embedding, output a plurality of facial modeling parameter values that are descriptive of a plurality of facial attributes of the face;
at least one non-transitory computer-readable medium that stores instructions that, when executed by the at least one processor, cause the computing system to:
obtain the embedding from the image recognition model, the embedding produced by the image recognition model in response to receipt of the image of the face by the image recognition model;
input the embedding into the translation model;
receive the plurality of facial modeling parameter values as an output of the translation model;
input the plurality of facial modeling parameter values into said face modeler; and
receive the model of the face as an output of the face modeler.

11. The computing system of claim 10, wherein execution of the instructions further causes the computing system to:
generate an artistic rendering of the face based at least in part on the model of the face.

12. The computing system of claim 10, further comprising:
a face renderer that is operable to receive the plurality of facial modeling parameter values and, in response to receipt of the plurality of facial modeling parameter values, output a controlled rendering of the face;
wherein execution of the instructions further causes the computing system to:
input the plurality of facial modeling parameter values into the face renderer; and
receive the controlled rendering of the face as an output of the face renderer.

13. The computing system of claim 12, wherein execution of the instructions further causes the computing system to at least one of:
ascertain values for one or more of the plurality of facial attributes directly from the controlled rendering of the face; and
generate an artistic rendering of the face based at least in part on the controlled rendering of the face.

14. The computing system of claim 10, further comprising:
the machine-learned image recognition model;
wherein execution of the instructions further causes the computing system to:
input the image of the face into the machine-learned image recognition model; and
obtain the embedding from a pooling layer of the machine-learned image recognition model.

15. The computing system of claim 10, wherein the translation model comprises a neural network.

* * * * *